United States Patent Office.

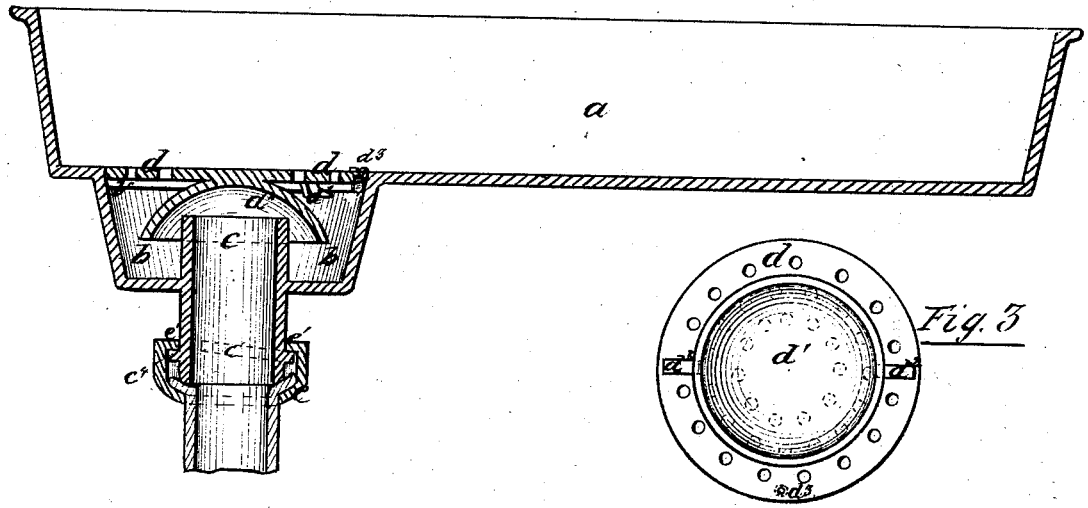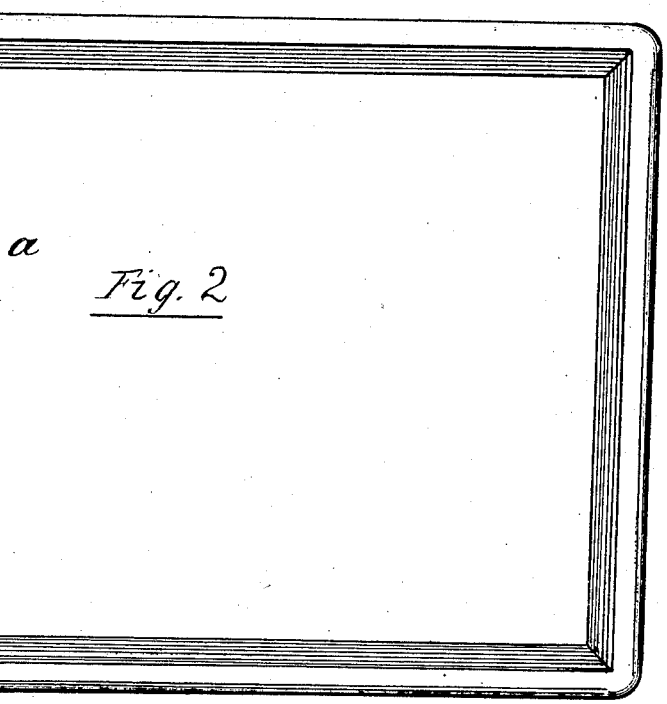

SAMUEL WALSH, OF NEW YORK, N. Y.

Letters Patent No. 108,538, dated October 18, 1870.

IMPROVEMENT IN SINKS.

The Schedule referred to in these Letters Patent and making part of the same.

I, SAMUEL WALSH, of New York, in the county and State of New York, have invented certain Improvements in Sinks, of which the following is a specification.

My invention embraces such improvements in the manufacture of cast-iron sinks and traps, by means whereof the cost of manufacture is greatly reduced, and enables persons who are not mechanics to clean out the trap when stopped up, thus saving the trouble and expense of calling in a plumber for that purpose, as has now to be done with the sinks and traps at present in use.

The sinks and traps as now made are cast separately, and are fastened together by two or more bolts.

The traps are known as the S-traps, and often when stopped up have to be separated from the sink to be cleaned out; they are not always perfect traps, for if a large body of water is poured into the sink, or is passing down the main pipe, with which the several pipes from the sinks of a tenement-house connect, the S is liable to act as a siphon and draw out all the water from the trap; when, of course, it does not answer the purpose for which it was designed, but allows the effluvia from the drain to pass into the building.

I obviate all these difficulties by my invention in making the sink and trap in one casting, and by using an improved form of trap.

In the accompanying drawing forming part of this specification—

Figure 1 is a section of my improved sink;

Figure 2 is a plan of the same, with the strainer removed; and

Figure 3 is a view of the under side of the strainer.

The sink $a$ is cast with the body of the trap $b$, in the center of which is the short pipe $c$, standing up a short distance from the bottom of the trap $b$, and extending below a sufficient distance to make the connection with the waste-pipe.

Near the top of the trap $b$ is the inside flange $b'$, upon which the strainer $d$ rests.

On the under side of the strainer $d$ is the inverted cup $d^1$, which, when the strainer is in place, extends below the top of and outside the pipe $c$, but does not touch it, leaving a sufficient space for a free passage of water.

The strainer $d$ is provided with the lips $d^2 d^2$, which pass through breaks in the flange $b'$, and the strainer being turned partly round, they catch under the flange $b'$ and keep the strainer from rising.

The set-screw $d^3$ is then screwed through the strainer, so that its end passes into one of the breaks in the flange $b'$, and prevents the strainer $d$ being turned.

The strainer may be held down by a screw passing through the center of it, and screwed into a bridge across the upper part of the pipe $c$.

On the outside of the lower end of the pipe $c$ are cast two inclined flanges, $c' c'$, which hold the coupling $e$, by means of two projections, $e' e'$, on the inside of the coupling.

The end of the waste-pipe, which is made of lead, is passed through the coupling $e$, and spread out so as to fit the inside of it; the coupling is then placed over the end of the pipe $c$, with the projections $e' e'$, bearing on the inclined flanges $c' c'$, and turned round until the lead pipe is pressed sufficiently between the coupling $e$ and end of the pipe $c$ to make a tight joint.

Some putty may be applied to the joint, if found necessary.

Instead of the inclined flanges, two lugs may be cast on the pipe $c$, for bolts to pass through them, and corresponding lugs on the coupling, as is now in general use.

When the trap is stopped up, the strainer $d$ is removed by turning it round until the lips $d^2 d^2$ are opposite the breaks in the flange $b'$; it is then lifted out and the trap very easily cleaned.

If the stoppage is in the waste-pipe, a wire or stick may be used to remove it, or the water-hose may be fitted over the pipe $c$, and the pressure of the water from the hydrant is often sufficient to remove obstructions in the waste-pipe.

I claim as my improvement in sinks—

A sink, cast with the trap, in one piece, in the manner shown and described.

SAMUEL WALSH.

Witnesses:
WILLIAM SHEDLOCK,
ALFRED SHEDLOCK.